Sept. 8, 1964  J. S. KEAN, SR., ET AL  3,147,860
SHIPPING APPARATUS FOR SHEETS OR PLATES
Filed March 24, 1961  3 Sheets-Sheet 2

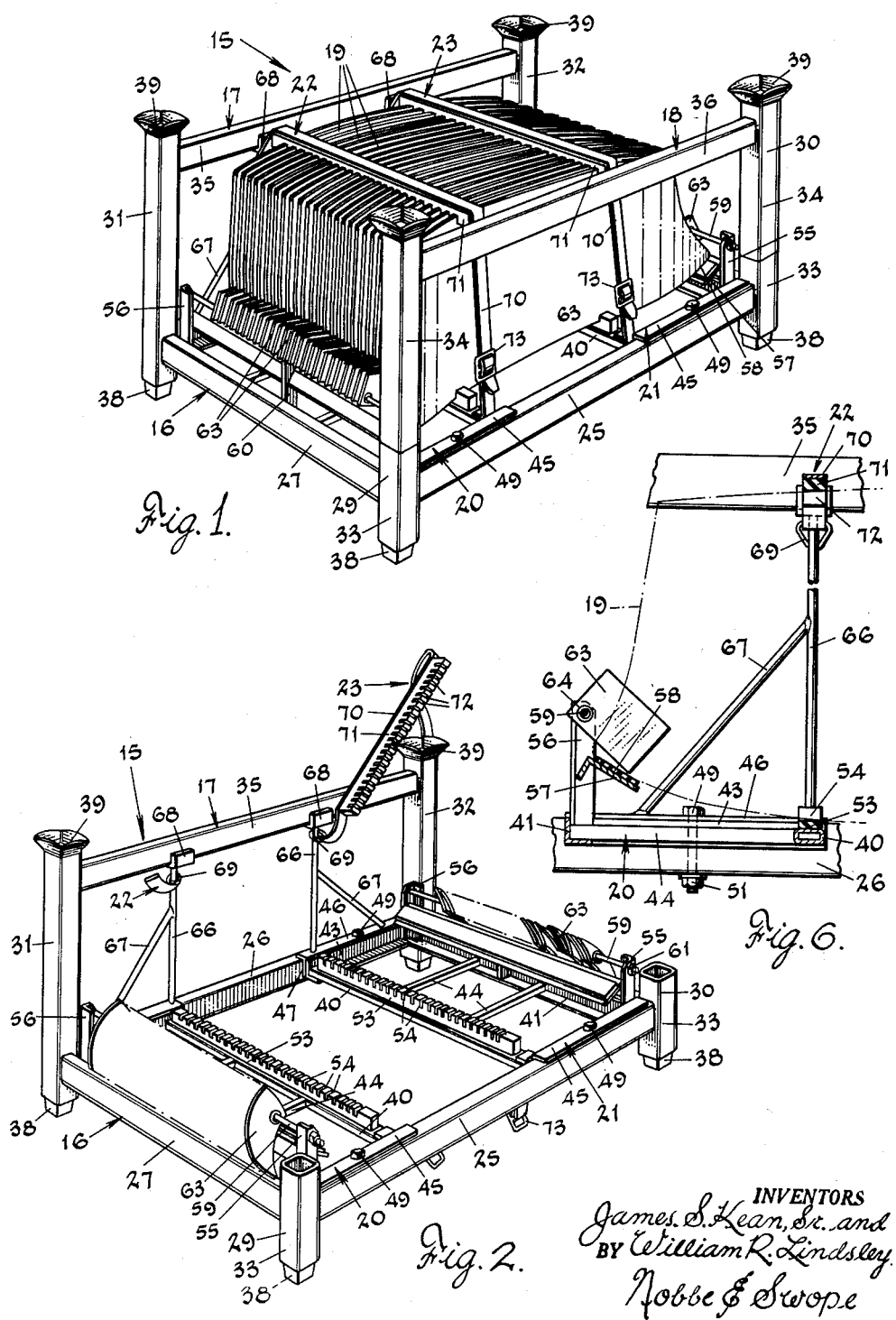

INVENTORS
James S. Kean, Sr. and
BY William R. Lindsley

Nobbe & Swope
ATTORNEYS

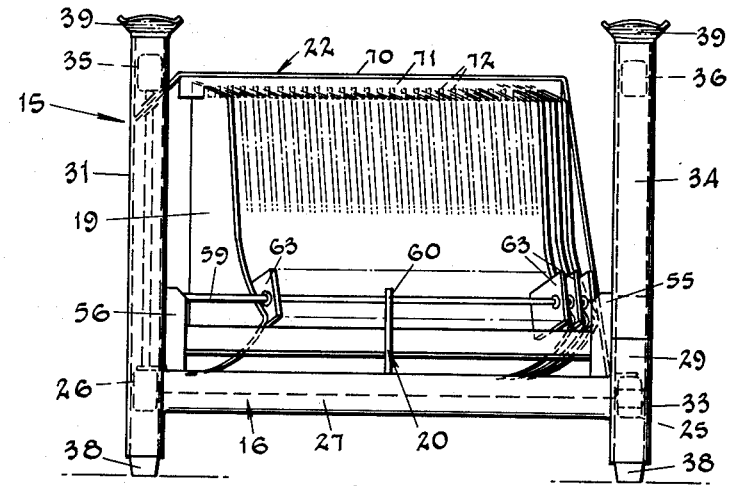
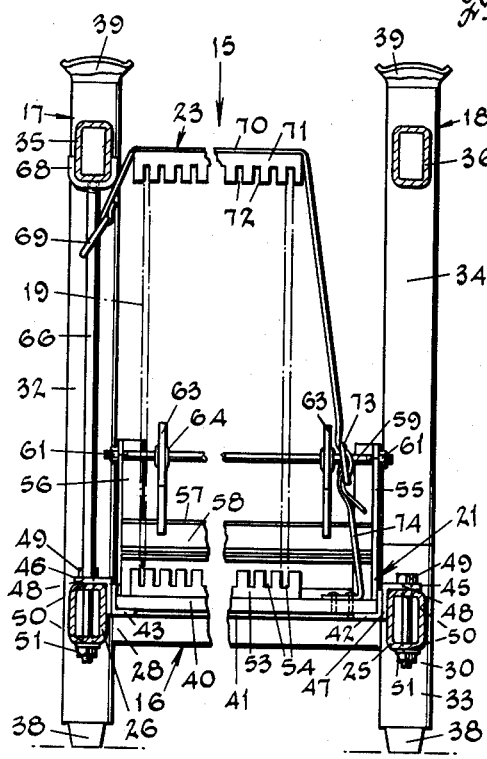

United States Patent Office 3,147,860
Patented Sept. 8, 1964

3,147,860
SHIPPING APPARATUS FOR SHEETS OR PLATES
James S. Kean, Sr., Toledo, and William R. Lindsley, Sylvania, Ohio, assignors to Libbey-Owens-Ford Glass Company, Toledo, Ohio, a corporation of Ohio
Filed Mar. 24, 1961, Ser. No. 98,047
9 Claims. (Cl. 206—62)

The present invention relates broadly to shipping apparatus for sheets or plates of glass or the like and is more particularly concerned with an improved apparatus for the transportation of bent or curved sheets of glass or the like.

An important object of this invention is to provide an improved apparatus which can be employed to great advantage in the handling and transporting, as well as storage, of a relatively large number of sheets of glass or the like safely and conveniently.

Another object of the invention is to provide an improved shipping apparatus of the above character upon which a plurality of sheets can be easily and quickly loaded and transported while maintained in fixed spaced relation to one another so that chipping or breakage of the sheets is reduced to a minimum not only while being transported but also during loading.

Other objects and advantages of the invention will become more apparent during the course of the following description when read in connection with the accompanying drawings.

In the drawings, wherein like numerals are employed to designate like parts throughout the same:

FIG. 1 is a perspective view of a shipping apparatus as constructed in accordance with the invention;

FIG. 2 is a perspective view of the shipping apparatus when parts thereof are arranged for loading or unloading operations;

FIG. 5 is an end elevational view;

FIG. 6 is a longitudinal vertical section of a glass sheet supporting member as taken on line 6—6 of FIG. 3;

FIG. 7 is a transverse vertical section as taken on line 7—7 of FIG. 3; and

FIG. 8 is a view illustrating several of the shipping apparatus in stacked arrangement for transportation purposes.

Figure 3:
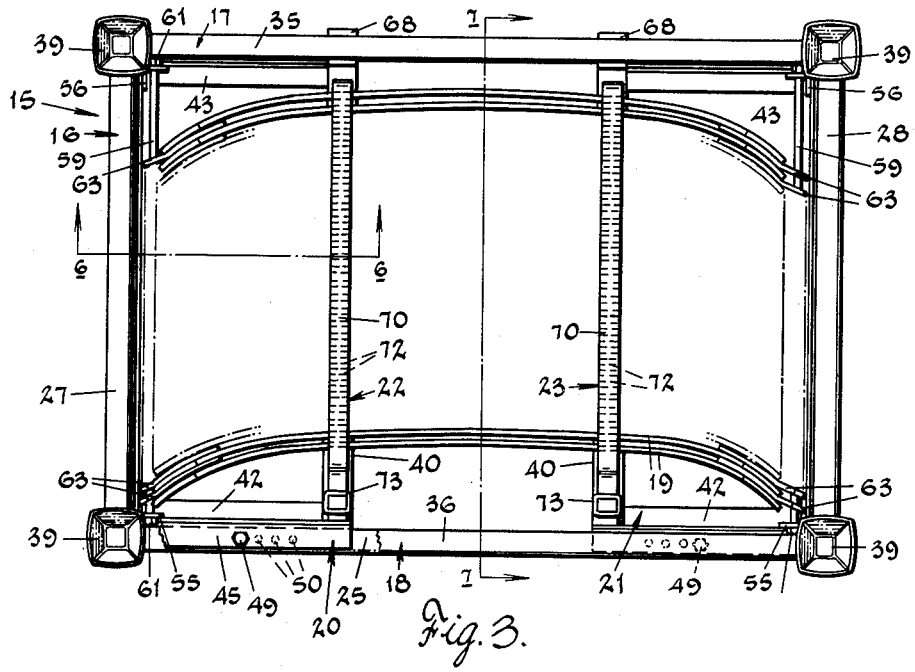
FIG. 3 is a plan view of the shipping apparatus.

Although not restricted thereto, the shipping apparatus of this invention has been advantageously employed in the transportation of glass sheets, such as the windshields or rear windows of automobiles, and will thus be herein described. In this connection, it is realized that for many years such bent articles, as automobile windshields, have been conveniently handled in shipping containers of heavy corrugated paper board or reinforced wood paneling. Since containers for such materials have no particular "end" use to the customer once the windshields have been removed, they have usually been returned to the supplier and/or manufacturer for later shipping purposes. However, several objectionable features have been known to exist in view of the fact that such types of containers are not adapted to convenient interim handling and are highly susceptible to damage in normally expected use. Additionally, by reason of their substantially closed nature, it is not readily possible to observe their contents even though the outwardly visible shipping instructions may include the necessary information or designation. Therefore, the present invention contemplates the provision of a substantially indestructible shipping apparatus that is well adapted to transport sheet materials, to enable easy inspection thereof and to afford a rigid re-useable structure for transportation purposes.

Referring now to the drawings and particularly to FIG. 1 thereof, there is shown a shipping apparatus constructed in accordance with the invention and designated in its entirety by the numeral 15. As disclosed, the apparatus 15 comprises a horizontal supporting base 16, a vertical rear wall 17 and a vertical front wall 18 between which a plurality of bent glass sheets 19, such as automotive windshields, are suitably contained for shipment. Generally stated, the glass sheets 19 are supported on their lower edges by adjustably positioned sheet supporting frames 20 and 21 while their upper edges are secured against relative movement by means of strap members 22 and 23.

More particularly, the base 16 of the shipping apparatus consists of a substantially rectangular framework comprising horizontally disposed longitudinal front and rear rails 25 and 26; transversely disposed end rails 27 and 28 (FIG. 3) and vertically disposed standards 29, 30, 31 and 32 arranged at the corners formed by the adjacent ends of the longitudinal and transverse rails and to which said rails are secured. In order to reduce the body weight of the shipping apparatus, the several rails and standards are of a tubular formation and, although selection of the actual material of their structure is in no wise limited, it has been found preferable to employ such light-weight, yet strong materials as aluminum, alloys thereof, or the like.

As viewed in FIGS. 1 and 2, it will be seen that the standards 29 and 30 at the front of the frame are each formed of two separable sections so that the front wall 18 can be readily removed and replaced with reference to the base 16. Thus, each front standard 29 and 30 comprises a fixed or stationary bottom section 33 and a removable upper section 34. At the rear of the frame is a longitudinal bracing rail 35 extending between and connecting the upper ends of the standards 31 and 32, while a similar bracing rail 36 extends between and connects the upper ends of the standards 29 and 30 at the front of the frame.

Figure 4:
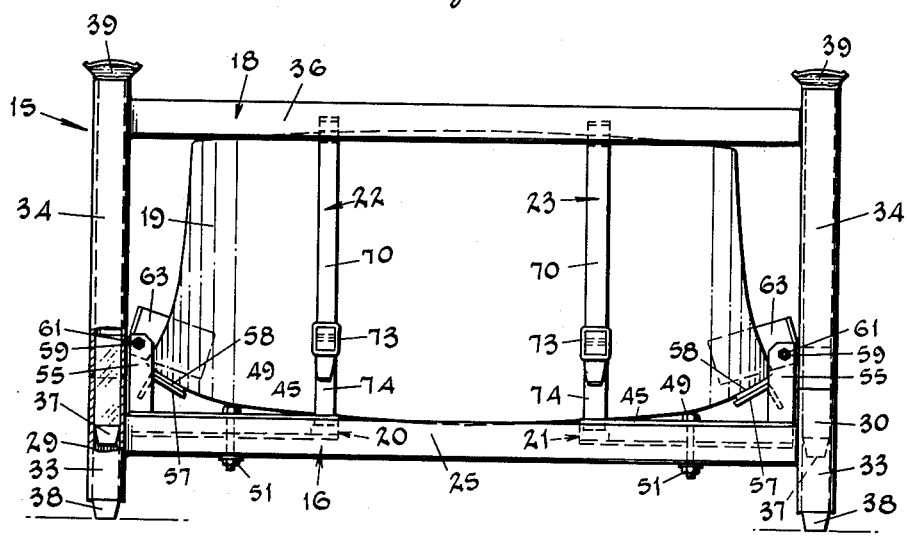
FIG. 4 is a front elevational view.

The front wall 18 as mentioned above is removable with respect to the base 16, and for this purpose the lower end of the upper section 34 of each standard 29 and 30 is reduced in size to provide a tapered boss 37 (FIG. 4) which is adapted to be received in the open upper end of the respective bottom section.

For purposes to be hereinafter more fully set forth, the lower ends of the standards 31 and 32 and the stationary sections 33 of standards 29 and 30 are each provided with a conical, four-sided foot 38. And, at the upper ends of the standards 31 and 32 and the movable sections 34 of standards 29 and 30, there is provided a four-sided socket or cup-shaped member 39. This is to provide the shipping apparatus 15 with suitable members which are adapted to readily interfit and thereby effect a rigidly supported relation between several shipping apparatus when the same are arranged in stacked relation as in FIG. 8.

As viewed in FIG. 1 and more particularly in FIGS. 2, 6 and 7, the several glass sheets 19 are supported in spaced relation at their lower edges by means of the sheet supporting frames 20 and 21 which are arranged between the front and rear longitudinal rails 25 and 26 and closely adjacent the end rails 27 and 28. The frames 20 and 21 are equipped to support the lower edges of the glass sheets without damage by abrasion or chipping and to simultaneously maintain the several sheets in spaced relation to one another. For these purposes, each frame 20 and 21 is substantially rectangular and comprises spaced inner and outer side members 40 and 41 and end members 42 and 43 connecting the side members at their opposite ends. As best shown in FIG. 6, the side member 40 is of tubular cross-section while the side member 41 is in the form of an angle iron. Arranged between the end members 42 and 43 are braces 44 secured at their ends to the oppositely disposed side members 40 and 41.

Each of the sheet supporting frames 20 or 21 is adjustably supported on the base 16 by outwardly directed flanges 45 and 46 which comprise the horizontal legs of angle members and with the vertical legs 47 thereof secured to the outer surfaces of the respective ends 42 and 43 of the frames. To firmly and yet adjustably position each frame within the base 16, the horizontal flanges 45 and 46 are formed with bolt receiving holes 48 (FIGS. 3 and 7) through which bolts 49 are inserted through holes 50 in the base rails 25 and 26. Several holes 50 are located in longitudinally spaced relation in the front and rear base rails to enable the frames to be shifted between the end rails 27 and 28 and secured in the best position according to the length and/or curvature of the bent glass sheets to be supported thereupon. The bolts are then inserted through the aligned holes 48 and 50 and nuts 51 threaded onto their ends.

On the upper surface of each side-forming tubular member 40, there is provided a strip of non-abrasive material 53, such as rubber or the like, in the upper surface of which a plurality of vertically disposed, and equally spaced-apart transverse notches 54 are formed. The rubber strips or elongated bars 53 are adhered to the members 40 by a suitable cement or alternatively secured thereto as by bolts or rivets. In the opposite corners of each frame 20 and 21, as at the junctures of the ends 42 and 43 with the side element 41, vertical posts 55 and 56 are secured. The posts 55 and 56 carry therebetween a plate 57 disposed in an angularly disposed plane to the transverse axis of either frame 20 or 21 and inclined toward the bar 53; the plate 57 having a layer 58 of non-abrasive, resilient material secured to its upwardly directed surface. Near their upper ends and above the plate 57, the posts 55 and 56 also support a rod 59. And the plate 57 and rod 59, between the posts 55 and 56, are additionally maintained from undesired flexing by a vertical brace 60 secured to the side member 41 (FIG. 5). Preferably each of the rods 59 are provided with threaded ends and are held by nuts 61 from endwise movement relative to posts 55 and 56.

Each rod 59 carries a number of flexible plate-like spacers 63 of non-abrasive material as rubber. Each spacer is provided in one corner with a grommet or ring 64 through which the rod 59 is inserted and, in usual practice, an equal number of the spacers are located on either side of the brace 60 and between the posts 55 and 56. The spacers 63 are intended to be freely slidable and swingable on the rods 59 to the end that in succession they can be moved from a position as shown in FIG. 2 to positions shown in FIGS. 1, 4 and 5 between the glass sheets to prevent the ends thereof striking or otherwise inadvertently marring the surfaces of the ends of the adjoining glass sheets.

The rear end rail 43 of each frame, on the flange 46 thereof, is provided with a vertically disposed rod 66 which is braced in its vertical projection above the flange 46 by an angular rod 67. At its upper end, each rod 66 carries a U-shaped clip 68 which is adapted to slidably engage the bracing rail 35. Preferably, the clip 68 is attached to the end of rod 66 through a threaded connection in order that an end ring 69 of either of the clamping strap members 22 or 23 may be initially located on the rod.

As shown in FIGS. 1 and 5, these straps 22 and 23 serve to simultaneously prevent the glass sheets or windshields from moving upwardly out of the notches 54 of the strips 53, engaging their lower ends, while maintaining the upper ends of the sheets in substantially equally spaced relation to one another. It is appreciated that the form of hold-down member, or clamping strap, as herein set forth is only one of many practical devices that can be employed for this or like purposes. Essentially, such purpose is to engage the upper ends of an article with easy and ready installation; to firmly hold a plurality of like articles from movement individually or as a collective body, and to be as readily released when the articles are to be removed. Thus, the clamping straps 22 or 23 include a strip of canvas or light leather 70 to which is secured, as by cementing, riveting or bolting, an elongated strip 71 of rubber material similar to the strip 53, and which likewise has a series of notches 72 formed therein. The end ring 69 is suitably attached to one end of the strip 70 whereby the strap can be placed out of the way as in FIG. 2 or positioned above a number of glass sheet articles as viewed in FIGS. 1, 4 and 5. The free end of each strap 22 or 23 is adapted to be passed through a buckle 73 attached by a strip of flexible material 74 to an adjacent side member 40 of the frame 21 or 21. Since the end rings 69 are slidable along their respective rods 66, the clamping straps 22 and 23 can be readily located with respect to the width of the glass sheets or their height above the bar 53.

In use, the shipping apparatus 15 is ordinarily located, as described herein by way of illustration, in a final inspection area wherein completed windshields, and/or back window glass, are received and processed for distribution to a point of installation. As viewed in FIG. 2, the front wall 18 has been preparatorily removed by withdrawal of the bosses 37 from the ends of the fixed standard sections 33. Also the hold-down or clamping straps 22 and 23 are placed about the upper ends of the rear standards 31 and 32 or otherwise suitably positioned to not interfere with the loading operation. It will also be noted that the spacers 63 have been severally swung to outwardly disposed positions.

The first glass sheet 19 is placed at its lower edge in the rearmost notches 54 of the rubber strips 53 and so that the lower edge of each end area will be supported on the resilient layers 58 of the plates 57. The angularity of the plates 57 is to generally approximate a plane coincidental with the curved contour of these areas of the lower edge and by reason of the resiliency of the layers 58 the adjacent edges of the glass sheets can be rested thereupon. A spacer 63 is now brought into position against the inwardly facing surface at each end area of the windshield or other bent glass sheet. The loading is thus continued by loading the glass sheets toward the forward end of the base 16 of the shipping apparatus. The exact number of bent glass sheets may vary according to the degree of curvature in the end or wing areas which would require that the sheets could be placed in each of the notches 54 or in alternately located and aligned notches. Ordinarily, however, loading of the bent glass sheets proceeds toward the front end of the shipping apparatus and with spacers 63 being placed between each of the adjacent sheets. Finally, the straps 22 and 23 are placed on the upper edges of the glass sheets and the said upper edges received in the notches 72 of the strips 71. The free end of each strap is then passed through a buckle 73 and pulled sufficiently therethrough to draw the strips 71 onto the tops or upper edges of the glass sheets with the upper edges thereof firmly spaced by the said notches.

The shipping apparatus is finally prepared for transporting by relocating the front wall 18 with the bosses 37 thereof inserted in the upper ends of the fixed sections 33 of the front standards 29 and 30. Since the undersurfaces of the longitudinal and transverse rails 25, 26, 27 and 28 are in a common horizontal plane and considerably below the lower edges of the glass sheets, the forks of a lift-track can be moved therebeneath either from the front, rear or ends of the base 16. When so supported, the loaded shipping apparatus can be moved into a railroad car or, in certain instances, to an area of temporary storage. In either case, several apparatus can be stacked one above the other with the tapered feet 38 of an upper apparatus being received in the cup-shaped members 39 at the upper ends of the standards of the lower apparatus.

In fact, as shown in FIG. 8 of the drawings, this stacked arrangement enables the filling of a railroad box car, indicated by the numeral 75, with a sufficient number of shipping apparatus to transport a materially increased number of windshields or like bent glass sheets safely to the point of destination. As well, due to the novel manner in which the plurality of glass sheets are firmly supported in spaced relation to one another, the possibility of marring or other inadvertent damage thereto is materially reduced. One of the more important features of the invention resides however in the rigid structure of the shipping apparatus which affords a transporting medium for glass sheets with a considerably extended amount of useful service.

It is to be understood that the forms of the invention herewith shown and described are to be taken as illustrative embodiments only of the same, and that various changes in the shape, size and arrangement of parts may be resorted to without departing from the spirit of the invention.

We claim:

1. In a shipping apparatus for sheets of rigid material, a substantially rectangular base comprising spaced pairs of longitudinal and transverse rails, standards disposed perpendicularly thereto at the corners formed by the adjacent ends of the longitudinal and transverse rails and to which said rails are secured, a pair of sheet supporting frames positioned between the spaced longitudinal rails and supported thereon adjacent the transverse rails, a strip member carried by each said supporting frame and extending transversely of the base, each said strip member being provided with a plurality of spaced notches for receiving therein the lower edges of the sheets to be shipped, an angled plate member also carried by each said supporting frame and extending transversely of the base for engaging the bottom edges of the sheets, means for preventing relative movement between the upper edges of the sheets comprising a strap member extending transversely of the base and having spaced notches for receiving the upper edges of the sheets therein, and means for securing said strap member in engagement with the sheets.

2. In a shipping apparatus as defined in claim 1, including means for adjustably securing said supporting frames to said longitudinal rails whereby they can be moved to different positions along said rails.

3. In a shipping apparatus as defined in claim 1, wherein each said supporting frame comprises spaced inner and outer side members extending transversely of the base, end members connecting the side members at their opposite ends, and means for securing said end members to the longitudinal rails of the base, said strip members being carried by the inner side members of said supporting frames and said angled plated members being carried by the outer side member of said supporting frames.

4. In a shipping apparatus as defined in claim 1, including a bracing rail extending horizontally between the upper ends of the two standards at one side of the base and spaced above the respective longitudinal rail of said base, bracing members extending between the sheet supporting frames and bracing rail, and means for attaching said strap member to one of said bracing members such that said strap member may be moved toward and away from the base to accommodate sheets of different widths.

5. In a shipping apparatus for sheets of rigid material, a substantially rectangular base comprising horizontally disposed longitudinal rails and transverse rails and vertically disposed standards arranged at the corners formed by the adjacent ends of the longitudinal and transverse rails and to which said rails are secured, a pair of rectangular sheet supporting frames positioned between the spaced longitudinal rails and slidably supported thereon, a strip member carried by each frame and extending transversely of the base, said strip member being provided with a plurality of spaced notches for receiving therein the lower edges of the sheets to be shipped, a bracing rail extending horizontally between the two standards at one side of the base and spaced above the respective longitudinal rail of said base, a vertical bracing member carried by each of said frames and slidably engaging the bracing rail so that said bracing members are movable with said frames along the longitudinal rails of the base, means for preventing relative movement between the upper edges of the sheets comprising at least one strap member extending transversely of the base and having spaced notches for receiving the upper edges of the sheets therein, means for slidably attaching one end of the strap member to one of said bracing members, and means for securing the opposite end of said strap member to said frame.

6. In a shipping apparatus as defined in claim 5, in which the standards at the opposite side of the base are composed of stationary bottom sections and removable upper sections, and a bracing rail extending between and connecting the upper removable sections.

7. In a shipping apparatus as defined in claim 6, in which the lower ends of the upper removable sections are removably received within the upper ends of the stationary bottom sections.

8. In a shipping apparatus for sheets of rigid material, a substantially rectangular base comprising horizontally disposed longitudinal rails and transverse rails and vertically disposed standards arranged at the corners formed by the adjacent ends of the longitudinal and transverse rails and to which said rails are secured, a pair of rectangular sheet supporting frames positioned between the spaced longitudinal rails and slidably supported thereon, each of said frames comprising spaced inner and outer side members extending transversely of the base and end members connecting the side members at their opposite ends, a strip member carried by the inner side member of each frame and provided with a plurality of spaced notches for receiving therein the lower edges of the sheets to be shipped, a bracing rail extending horizontally between the two standards at one side of the base and spaced above the respective longitudinal rails of said base, a vertical bracing member carried by each of said frames and slidably engaging the bracing rail so that said bracing members are movable with said frames along the longitudinal rails of the base, means for preventing relative movement between the upper edges of the sheets comprising strap members extending transversely of the base and having notches for receiving the upper edges of the sheets therein, means for slidably attaching the strap members at one end to said bracing members, means for securing the opposite ends of said strap members to said frames, an angled plate member carried by each said frame and extending transversely of the base for engaging the bottom edges of the sheets, and a plurality of flexible spacers swingably carried by each of the sheet supporting frames above the respective angled plate member and removably received between adjacent sheets.

9. In a shipping apparatus for sheets of rigid material, a substantially rectangular base comprising spaced pairs of longitudinal and transverse rails, standards disposed perpendicularly thereto at the corners formed by the adjacent ends of the longitudinal and transverse rails and to which said rails are secured, a pair of sheet supporting frames positioned between the spaced longitudinal rails and supported thereon adjacent the transverse rails, a strip member carried by each said supporting frame and extending transversely of the base, each said strip member being provided with a plurality of spaced notches for receiving therein the lower edges of the sheets to be shipped, an angled plate member also carried by each said supporting frame and extending transversely of the base for engaging the bottom edges of the sheets, a plurality of flexible spacers swingably carried by each of the sheet supporting frames above the respective angled plate member and removably received between adjacent sheets, means for preventing relative movement between the upper edges of the sheets comprising a strap member extending transversely of the base and having spaced notches for receiving the upper edges of the sheets therein, and means for securing said strap member in engagement with the sheets.

References Cited in the file of this patent

UNITED STATES PATENTS

| | | |
|---|---|---|
| 888,855 | Sisco | May 26, 1908 |
| 2,688,398 | Humphreys | Sept. 7, 1954 |
| 2,791,325 | Schecter et al. | May 7, 1957 |
| 2,919,022 | Lidgard | Dec. 29, 1959 |